United States Patent
Bjarnason et al.

(10) Patent No.: US 9,807,675 B2
(45) Date of Patent: Oct. 31, 2017

(54) METHOD FOR SYNCHRONIZING A MOBILE STATION TO A BASE STATION

(75) Inventors: Elias Bjarnason, Grasbrunn (DE); Stefan Eder, Grafenau (DE)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 13/206,407

(22) Filed: Aug. 9, 2011

(65) Prior Publication Data

US 2012/0058761 A1    Mar. 8, 2012

(30) Foreign Application Priority Data

Aug. 9, 2010    (EP) ..................................... 10008285

(51) Int. Cl.
  *H04W 48/12*    (2009.01)
  *H04M 1/725*    (2006.01)

(52) U.S. Cl.
  CPC ....... *H04W 48/12* (2013.01); *H04M 1/72508* (2013.01)

(58) Field of Classification Search
  None
  See application file for complete search history.

(56) References Cited

U.S. PATENT DOCUMENTS

| | | | |
|---|---|---|---|
| 5,088,108 A * | 2/1992 | Uddenfeldt et al. | 375/230 |
| 5,528,623 A * | 6/1996 | Foster, Jr. | 375/133 |
| 5,758,090 A * | 5/1998 | Doner | 709/236 |
| 6,014,376 A * | 1/2000 | Abreu et al. | 370/350 |
| 6,526,295 B1 * | 2/2003 | Shull | 455/574 |
| 2004/0157631 A1 * | 8/2004 | Stobart | H04W 56/0085 455/502 |
| 2009/0168763 A1 * | 7/2009 | Choi | 370/352 |
| 2011/0269502 A1 * | 11/2011 | Clark | H04B 1/006 455/552.1 |
| 2012/0264407 A1 * | 10/2012 | Majmundar et al. | 455/414.1 |

FOREIGN PATENT DOCUMENTS

| | | |
|---|---|---|
| EP | 0930794 A1 | 7/1999 |
| EP | 1063836 A2 | 12/2000 |
| EP | 2015550 A1 | 1/2009 |
| WO | 2008113754 A2 | 9/2008 |

OTHER PUBLICATIONS

Andreas Molisch, Digital Enhanced Cordless Telecommunications (DECT), Jan. 2005, John Wiley & Sons.*
DECT the standard explained, Feb. 1997.*
Digital cellular telecommunications systems (Phase 2+); Functions related to Mobile Station (MS) in idle mode and group receive mode (3GPP TS 43.022 version 9.1.0 Release 9). Global System for Mobile Communications. ETSI TS 143 022 V9.1.0 (Apr. 2010), 26 pages.

* cited by examiner

Primary Examiner — Tejis Daya
(74) Attorney, Agent, or Firm — Eschweiler & Potashnik, LLC

(57) ABSTRACT

The invention relates to a method for synchronizing a mobile station to a base station, comprising in the base station a act of generating an information about a frequency of a channel which is used to transmit data about the identity of the base station and a act of transmitting the information from the base station to the mobile station.

19 Claims, 5 Drawing Sheets

METHOD FOR SYNCHRONIZING A MOBILE STATION TO A BASE STATION

RELATED APPLICATION

This Application claims priority benefit of EP Application No. 10008285.8, which was filed on Aug. 9, 2010. The entire contents of the EP Application are hereby incorporated herein by reference.

FIELD OF THE INVENTION

The present invention relates to a method for synchronizing a mobile station to a base station. The invention further relates to a base station and a mobile station configured to synchronize to a mobile station and a base station, respectively.

BACKGROUND

After a mobile part is switched on, it starts searching for a base station. When a suitable base station is found, the mobile station synchronizes to the base station in order to establish and maintain a connection. For supporting the mobile station to lock on, a base station is continuously transmitting information on its identity and synchronization information on at least one channel.

In a DECT system, a base station broadcasts such information via a dummy bearer or beacon. In the following, the terms "dummy bearer" and "beacon" will be used synonymously. A dummy bearer usually comprises information about the identity of the base station, synchronization information, paging information and the like. In an unlocked state, a mobile station scans the relevant DECT channels to find a dummy bearer transmitted by a base station. Once a dummy bearer of a preferred base station is found, the mobile station will synchronize its timing with the timing of the base station and keep listening to further information broadcasted by the base station. The mobile station is now locked to the base station.

The DECT standard is provided by the European Telecommunications Standards Institute (ETSI). A current version of the DECT standard may, for example, be accessed by the home page of the ETSI (www.etsi.org). All contents of the DECT standard are incorporated herewith by reference.

According to the DECT standard, a mobile station does not receive information from the base station about frequency channels the base station will use for broadcasting its dummy bearer. That is, only after the mobile station has synchronized to the base station, the mobile station knows which channel is actually used. Information about a change of the dummy bearer channel is only broadcasted in certain frames. The mobile station can therefore only know the actual dummy bearer channel and in case of a change of the dummy bearer channel by staying in synchronization and constantly monitor the dummy bearer. If synchronization is lost, the mobile station is thus forced to scan the DECT channels one after another until a proper dummy bearer is found. An extended time required for searching a dummy bearer results in an increased energy consumption of the mobile station, since the mobile stations' radio receiver has to be active during the searching procedure. The increased energy consumption in turn leads to a reduced life time of the mobile stations' battery or accumulator.

SUMMARY

One embodiment of the invention provides an improved method for synchronizing a mobile station to a base station. Further, one embodiment of the invention provides a mobile station and a base station configured to execute such a method.

According to one aspect of the invention, a method for synchronizing a mobile station to a base station comprises generating, in the base station, an information about a frequency of a channel which is used to transmit data about the identity of the base station. The method further comprises transmitting the information from the base station to the mobile station.

By way of the transmitted information the base station may inform the mobile station which frequency channel it uses or will use to transmit its identity information. The mobile station will then search for a base station on the indicated frequency channel. If the mobile station is able to identify a base station on the frequency channel, the mobile station may then continue to time synchronize with the base station. The time required for searching and further synchronizing is thus considerably reduced. Consequently, the energy consumption of the mobile station is reduced and the life time of the mobile stations' rechargeable battery or accumulator is extended. Simulations performed in connection with the present invention have shown that the life time of a mobile stations' rechargeable battery or accumulator may be extended from about 10 years to about 17 years by applying the method according to the present invention.

According to an embodiment, the information is transmitted using the channel which is used to transmit data about the identity of the base station. Many channels used by a base station for transmitting its identity information employ data fields that are not completely filled with data. For example, in the case of a dummy bearer no data is normally comprised in the so-called B-field which represents the main part of the data field (so-called D-field). Similarly, a beacon may comprise data fields which are not completely reserved. The information about the frequency may thus advantageously be comprised in data fields that are not yet occupied by other data.

According to an embodiment, generating the information depends on a Received Signal Strength Indication (RSSI) measurement. This way the information may be chosen to specify a frequency channel having a low signal strength. It is then guaranteed that the mobile station searches for a channel which is suitable to provide a communication of good quality between the mobile station and the base station.

According to an embodiment, the information is generated randomly. A random generation of the information may be achieved in a quick and cost effective manner, for example by using a random generator.

According to an embodiment, generating and transmitting the information is repeatedly performed in time intervals depending on how often a communication between the base station and the mobile station or further mobile stations occurs. Since the quality of frequency channels may change over time, it may happen that a mobile station searches on a channel of bad quality due to an outdated information. This scenario might be avoided if the information is repeatedly and regularly generated, transmitted and updated.

It may not be necessary to generate and transmit the information if a communication between the mobile station and the base station has already been established. An unnecessary generation and transmission of the information may be avoided by taking into account how often a communication between the stations occurs. The more often a communication between the stations occurs, the more often the information should be generated. Vice versa, generating and transmitting the information is not required at frequent intervals if the stations rarely communicate.

According to an embodiment, the method further comprises generating and transmitting an information about a prospective change of the frequency of the channel. In this case, the base station does not only provide an information about a fixed or static frequency, but may also inform the mobile station on how the frequency might be adapted over time.

According to an embodiment, the method further comprises generating and transmitting an information about a further frequency of a channel. The quality of frequency channels depends on various conditions and may thus change accordingly. Therefore, it may be advantageous if the base station uses multiple frequency channels for transmitting the identity information. The mobile station may be informed about these additional frequency channels such that a search for a base station may be extended to multiple frequency channels.

According to an embodiment, the method further comprises ordering the generated information about the frequencies of the channels, wherein the ordering depends on an RSSI measurement. For example, the ordering may be chosen such that the mobile station first searches for a base station on the frequency channels having the lowest signal strengths. That is, the channels may be ordered according to increasing signal strengths. In an embodiment the ordering is repeatedly performed in time intervals depending on how often a communication between the base station and the mobile station or further mobile stations occurs. In a further embodiment the synchronizing is initiated by the mobile station, and the base station is in an active mode at the start of the initiation.

According to one further aspect of the invention, a method for synchronizing a mobile station to a base station comprises reading, in the mobile station, an information about a frequency of a channel. wherein the information has been transmitted from the base station to the mobile station. The method further comprises searching, in the mobile station, for a channel used to transmit data about the identity of the base station, thereby using the read information.

According to an embodiment, the information is read during a wake-up phase of the mobile station. The inventive method is particularly suited for this case, since during a wake-up phase it is desirable to quickly establish a connection between the mobile station and a base station.

According to an embodiment, the information is stored in the base station and/or in the mobile station. If the information is stored, the mobile station may use the information at arbitrary times, for example during a wake-up phase or during an active operating state after a communication between the mobile station and a base station has been broken down. A base station may store multiple information that has been previously transmitted. The information may then be analyzed in order to generate an improved information for future synchronization procedures.

According to an embodiment, the information is updated in the mobile station during a wake-up phase of the mobile station. By updating the information, it is guaranteed that the mobile station always searches on frequency channels currently used by the base station with the highest possible probability.

A base station, according to one embodiment of the invention, comprises a first unit to generate an information about a frequency of a channel which is used to transmit data about the identity of the base station. The base station further comprises a second unit to transmit the information from the base station to a mobile station.

A mobile station, according to one embodiment of the invention, comprises a first unit to read an information about a frequency of a channel, wherein the information has been transmitted from a base station to the mobile station. The mobile station further comprises a second unit to search for a channel used to transmit data about the identity of the base station, thereby using the read information. In an embodiment, the mobile station further comprises a third unit to store the information.

BRIEF DESCRIPTION OF THE DRAWINGS

The invention is explained below in an exemplary manner with reference to the drawings, in which FIG. 1 schematically illustrates a DECT frequency/time spectrum.

DETAILED DESCRIPTION

The following specification mainly refers to Digital Enhanced Cordless Telecommunications (DECT) systems. However, it is understood that the present invention may also be applied to other mobile radio telephone systems employing the features described in the following. In addition, the present invention is not restricted to standard DECT applications, but may also be applied to developments of the DECT standard, for example the Connectionless DECT Packer Service (CLDPS). The invention may further be applied to wireless metering or detector systems comprising a base station that regularly broadcasts information over a channel. For example, such systems may be used for energy measurements or fire detection.

The DECT standard is primarily used for cordless phone systems including base stations and mobile stations. In the following, the terms "base station", "base unit" and "fixed part" are synonymously used. Similarly, the terms "mobile station", "mobile part" and "portable part" refer to similar devices.

Figure 1:
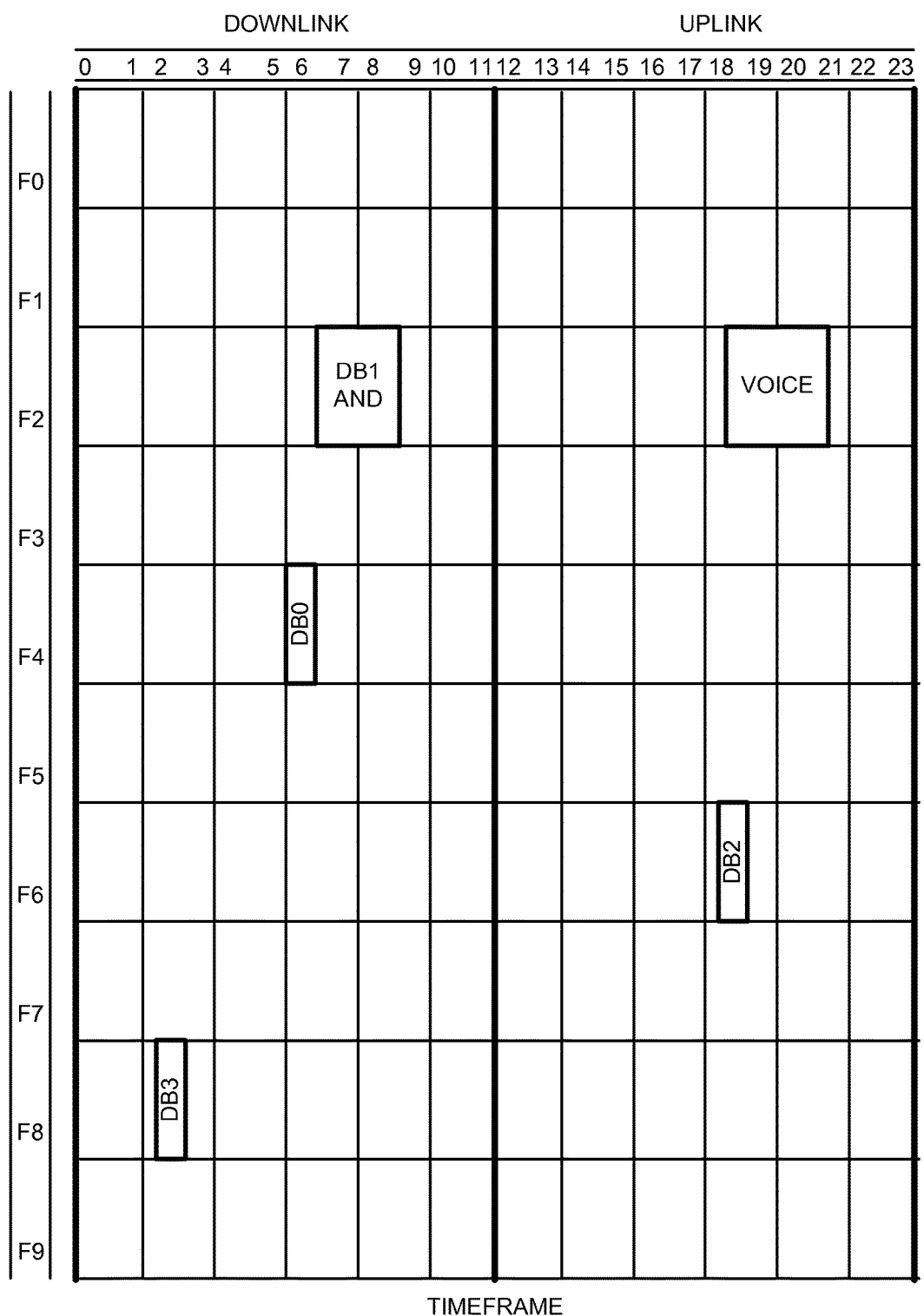

FIG. 1 schematically illustrates a DECT frequency/time spectrum. The DECT standard is based on the Multi Carrier (MC), Time Division Multiple Access (TDMA), Time Division Duplex (TDD) radio access methodology. The basic DECT frequency allocation uses ten carrier frequencies (MC) in the 1880 to 1900 MHz range. In FIG. 1, the ten frequencies or frequency channels are indicated by ten rows F0 to F9 with each row corresponding to one frequency channel. The time spectrum in DECT systems is divided into time frames repeating every 10 milliseconds (ms). Each time frame comprises 24 individually accessible time slots (TDMA). The 10 ms time frame is split in two halves (TDD), wherein the first 12 time slots are utilized for a transmission from a base station to a mobile station (downlink) and the second 12 time slots are utilized for a transmission from a mobile station to a base station (uplink). In FIG. 1, the 24 time slots are indicated by columns. The first 12 columns are enumerated from 0 to 11 and represent time slots reserved for the downlink while the second 12 columns are enumerated from 12 to 23 and represent time slots for the uplink. The described MC/TDMA/TDD concept thus results in a spectrum of 120 channels that are available for a base station to communicate with a mobile station and further 120 channels that are available for a mobile station to communicate with a base station. Accordingly, there are 120 channels available for the allocation of a dummy bearer. In FIG. 1, each square of the grid pattern corresponds to one of the (in total) 240 channels.

FIG. 1 illustrates the transmission of four different dummy bearers DB0 to DB3. As used herein, the term "dummy bearer" is intended to refer to a signal that is sent by a base station comprising information about the identity of the base station. The signal may further comprise information to be used for synchronizing the base station to a mobile station and vice versa, paging information, information on the channel capacity, etc. Note that the DECT standard of the ETSI provides information about properties of a dummy bearer used in the framework of the DECT standard. A beacon represents an enhanced version of a dummy bearer. In particular, a beacon may carry traffic (e.g. voice data) between the base station and the mobile station (so called "traffic bearer"). If a beacon does not carry traffic between the base station and the mobile station, the beacon corresponds to a dummy bearer.

In FIG. 1, the dummy bearer DB0 of a first base station is sent via frequency channel F4, thereby using the seventh time slot (time slot with number 6) of the downlink. Note that the dummy bearer DB0 does not necessarily occupy the whole channel as can be seen in FIG. 1 in which the dummy bearer DB0 does not completely fill the square representing the channel. The dummy bearers DB1, DB2 and DB3 correspond to dummy bearers sent by further base stations. Note, however, that a single base station may also send multiple dummy bearers.

Note further that the separation between the uplink channels and the downlink channels illustrated in FIG. 1 is based on a reference system of the dummy bearer DB0. In FIG. 1, the dummy bearer DB2 may thus be located in the uplink section although being transmitted from a base station to a mobile station. If a reference system of the dummy bearer DB2 would have been chosen for FIG. 1, the dummy bearer DB2 would have been located in the downlink section. The eighth and ninth time slot (time slots with numbers 7 and 8) of the frequency channel F2 are shared between the dummy bearer DB1 and voice data. The $20^{th}$ and $21^{st}$ time slot (time slots with numbers 19 and 20) of the frequency channel F2 are used for a transmission of voice data.

Figure 2:
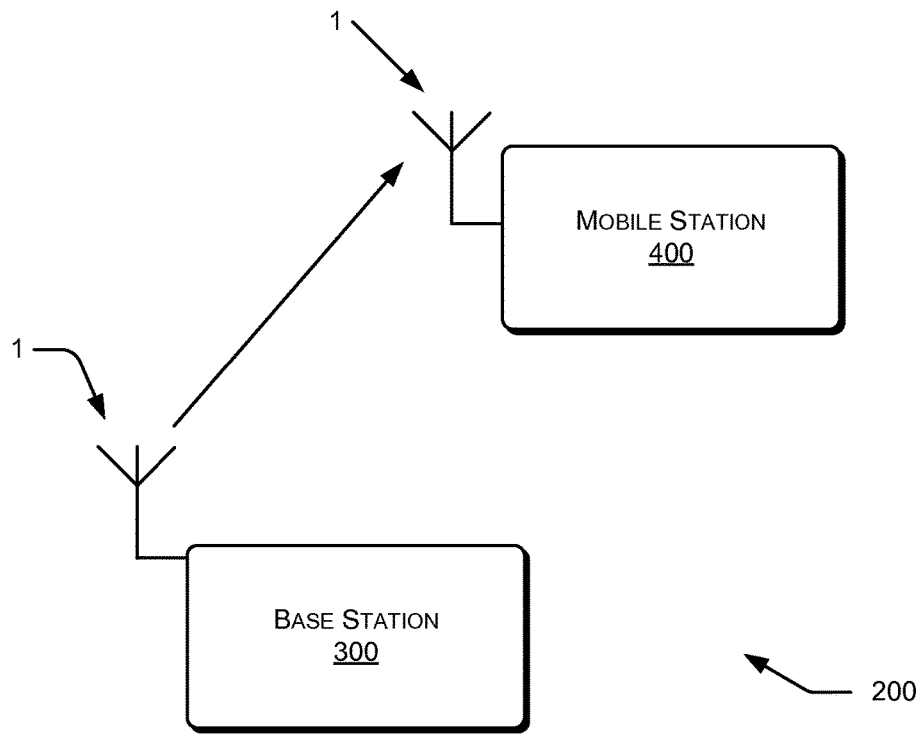
FIG. 2 schematically illustrates a communications system.

FIG. 2 schematically illustrates a communications system 200 comprising a base station 300 and a mobile station 400 according to an embodiment of the invention. It is understood that the system 200 may comprise further base stations and/or further mobile stations. The base station 300 comprises an antenna 1 to broadcast radio frequency signals including information about its identity, for example via one or more dummy bearers, thereby using one or more of the 120 downlink channels (see FIG. 1). The mobile station 400 comprises an antenna 1 to receive radio frequency signals, for example a dummy bearer sent by the base station 300. The base station 300 and the mobile station 400 are configured to execute a method 500 that is described in connection with FIG. 5. A more detailed description of the base station 300 and the mobile station 400 is given in FIGS. 3 and 4.

Figure 3:
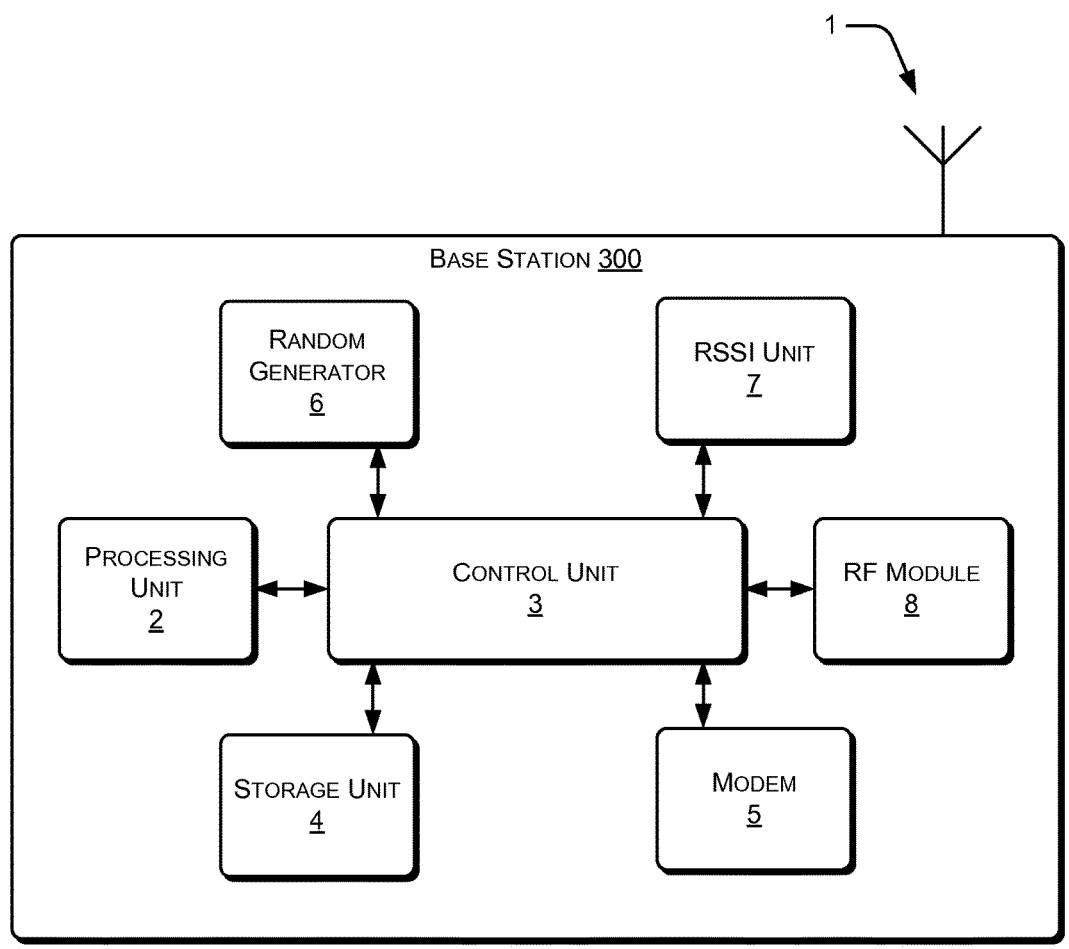
FIG. 3 schematically illustrates a base station.

FIG. 3 schematically illustrates a base station 300 according to an embodiment of the invention. The base station 300 may comprise a processing unit 2, a control unit 3, a storage unit 4, a modem 5, a random generator 6, an RSSI measuring unit 7, a radio frequency (RF) module 8 and an antenna 1. The components of the base station 300 are connected among each other (see arrows), for example by a bidirectional bus system. The processing unit 2 may comprise multiple components to process digital signals, for example filters, decoders, encoders, scrambling units, descrambling units, digital signal processors (DSP), etc. The modem 5 is configured to modulate a signal output by the processing unit 2, for example according to a Gaussian frequency shift-keying (GFSK) scheme. In turn, the modem 5 may demodulate a signal received by the RF module 8 and provide the demodulated signal to the processing unit 2 under control of the control unit 3.

The RF module 8 may receive a signal modulated by the modem 5, mix the modulated signal into a radio frequency band and amplify the signal. The radio frequency signal may then be broadcasted by the antenna 1. The base station 300 further comprises a Digital-to-Analog Converter (DAC) (not illustrated) to convert a digital signal into an analog signal before the signal is transmitted by the antenna 1. The DAC may, for example, be located in the RF module 8. The RF module 8 may receive a signal from the antenna 1 and forward the received signal to the control unit 3. Here, an Analog-to-Digital Converter (ADC) (not illustrated), which may be located in the RF module 8, is used to convert a received analog signal to the digital domain. The forwarded signal may be demodulated by the modem 5 and afterwards transmitted to the processing unit 2 for a further processing.

The RSSI measuring unit 7 is configured to measure RSSI values, for example for the frequency channels F0 to F9 (see FIG. 1). The random generator 6 is configured to generate random values that may be used for various purposes. The generated values may represent information about frequencies or frequency channels that will be used for a transmission of a dummy bearer. For example, at a startup of the base station 300 the random generator 6 may generate a random order of frequency channels taken from the group of the channels F0 to F9.

The storage unit 4 may be used to store arbitrary data, for example results of RSSI measurements or random information generated by the random generator 6. The control unit 3 controls the communication between the components of the base station 300. Further, the control unit 3 is configured to create a dummy bearer and complete the dummy bearer with information on which frequency channels the dummy bearer will be broadcasted. Here, the information may be assigned to an arbitrary part of the data fields of the dummy bearer. For example, the information may be assigned to the B-field. Further details on a method 500 executed by the base station 300 will be described in connection with FIG. 5.

Figure 4:
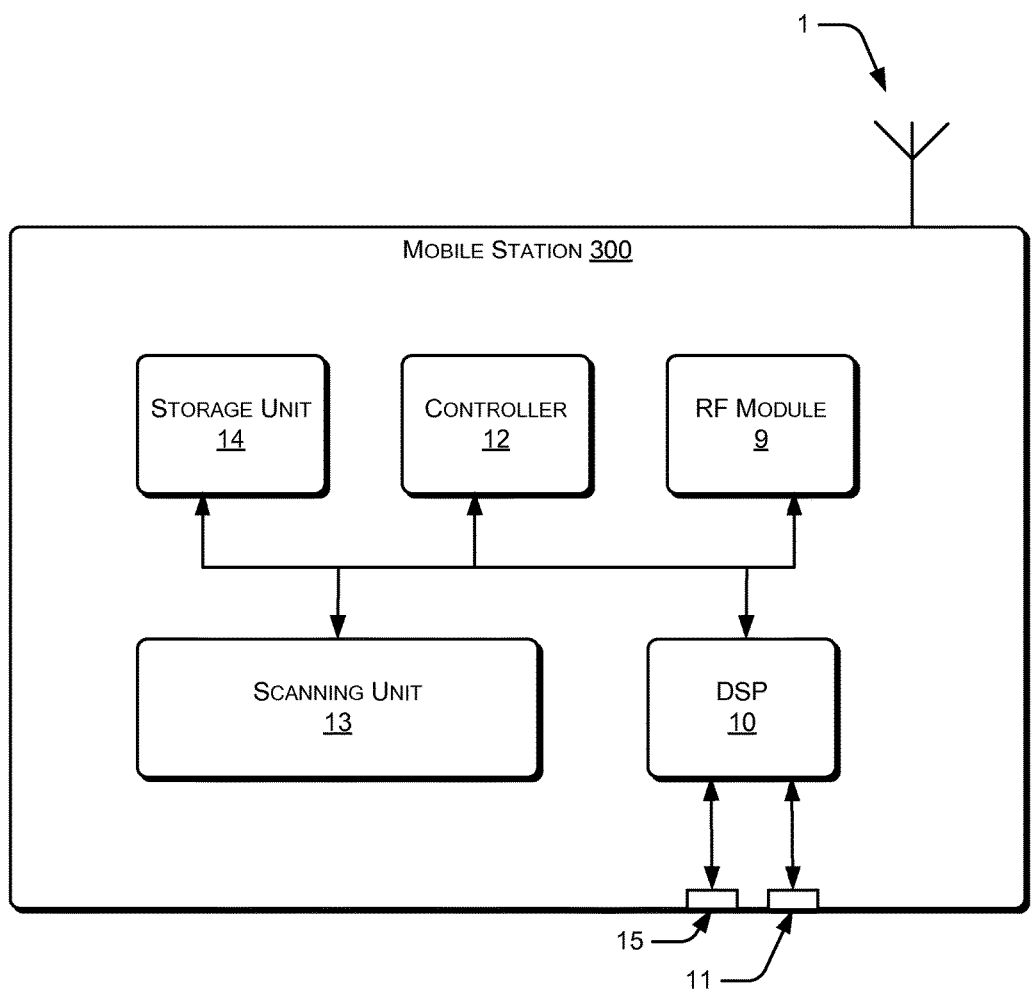
FIG. 4 schematically illustrates a mobile station.

FIG. 4 schematically illustrates a mobile station 400 according to one embodiment of the invention. The mobile station 400 comprises an RF module 9, a DSP 10, a microphone 11, a burst mode controller 12, a scanning unit 13, a storage unit 14 and a loudspeaker 15. The components of the mobile station 400 are connected among each other as indicated by the arrows, for example by a bidirectional bus system.

The RF module 9 functionally corresponds to the RF module 8 of FIG. 3. The DSP 10 is configured to process digital data, for example voice data received over the microphone 11 or data to be output by the loudspeaker 15. The scanning unit 14 is configured to scan received signals in order to find a base station by identifying its dummy bearer. The search may be based on finding a data sequence identifying the base station. Here, the scanning unit 13 may selectively scan the relevant channels of FIG. 1. The storage unit 14 may store various data, for example information comprised in a dummy bearer. In particular, the storage unit 14 memorizes information about frequencies that are used by the base station to broadcast its dummy bearer(s).

Figure 5:
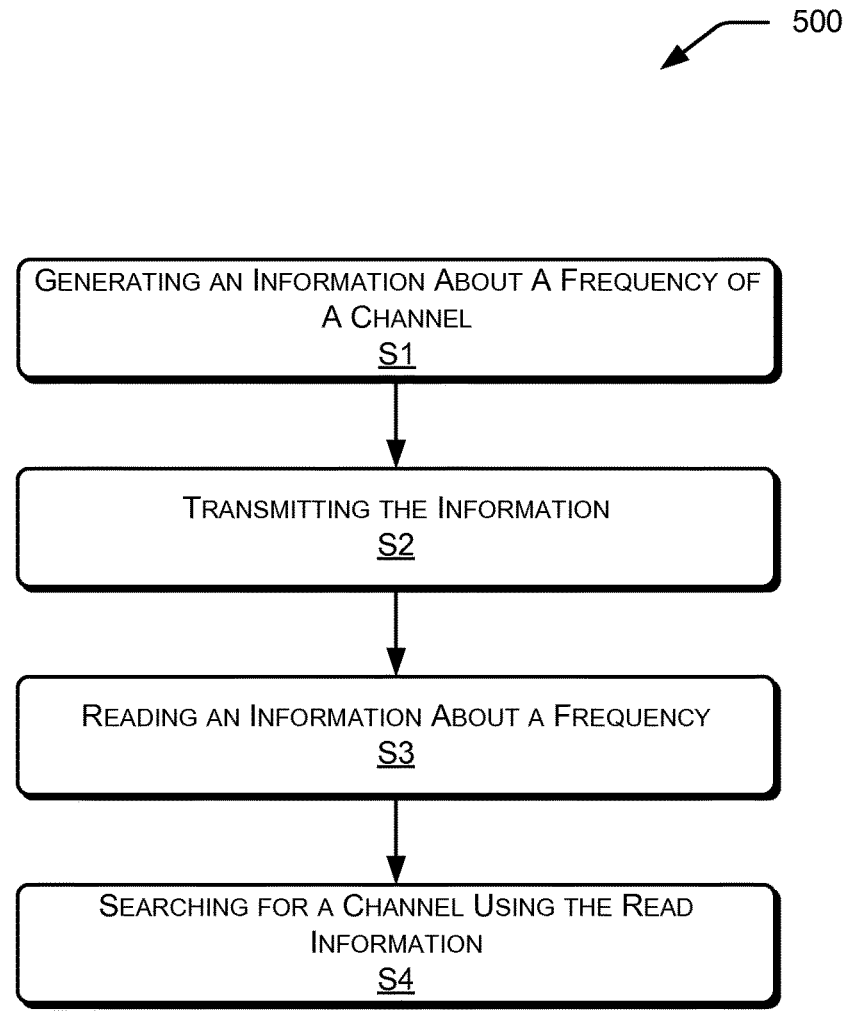
FIG. 5 schematically illustrates a method for synchronizing a mobile station to a base station.

FIG. 5 schematically illustrates acts of a method 500 for synchronizing a mobile station to a base station according to the present invention. The method 500 may be read in connection with the base station 300 of FIG. 3 and the mobile station 400 of FIG. 4. In a first method act 51, an information about a frequency of a channel which is used to transmit data about the identity of the base station is generated in the base station. For the case of a DECT system the channel to transmit the identity information may be a dummy bearer or a beacon. For the sake of simplicity the specification of FIG. 5 refers to a dummy bearer.

Referring back to FIG. 3, the information about the frequency may be generated by the random generator 6 which may randomly choose one of the ten frequencies F0 to F9 (see FIG. 1). Alternatively, the RSSI measuring unit 7 may measure the signal strengths of the frequency channels F0 to F9 and the control unit 3 then chooses the channel with the lowest signal strength.

It is understood that the information generated in the base station is not necessarily restricted to only one frequency, but may also comprise information on further frequencies. In this case, the random generator 6 may randomly choose multiple frequencies from the frequencies F0 to F9. Similarly, the control unit 3 may choose various frequencies based on measurements performed by the RSSI measuring unit 7. For example, the information about the frequencies may be ordered according to increasing signal strengths of the corresponding frequency channels. The control unit 3 may further prepare the information in an appropriate form, for example in form of a sorted list.

It is noted that generating the information by the base station may be performed at arbitrary times. For example, the information may be generated at a startup of the base station. According to another embodiment, the information may be repeatedly generated and/or repeatedly ordered in time intervals depending on how often a communication between the base station and the mobile station and/or further mobile stations occurs.

Preferably, the base station only changes the frequency channel used for the dummy bearer when a collision with further transmissions on the channel occurs, i.e. when the channel is overcrowded. If a shifting of the dummy bearer is required, the base station preferably moves the dummy bearer to another time slot of the presently used frequency channel before another frequency channel with a lower priority is chosen. If the dummy bearer has been moved to another frequency channel, the base station may regularly monitor if the previously used frequency channel becomes available again such that the dummy bearer can be moved back to the channel of higher priority. Note that the information about the frequency/frequencies is not necessarily of static or fixed character, but may be adaptive. The base station may generate further information, for example an information about how the frequency/frequencies will change over time.

In a second method act S2, the generated information is transmitted from the base station to the mobile station. For the transmission an arbitrary channel may be used. For example, the information may be transmitted using the dummy bearer itself. Referring back to FIG. 3, the RF module 8 prepares an analog radio frequency signal after the information about the frequency has been generated and prepared by the control unit 3. The radio frequency signal is then transmitted over the air interface by the antenna 1.

In a third method act S3, the mobile station reads the information which has been transmitted by the base station. For example, the information may be read from the storage unit 14 of FIG. 4 to which the information has previously been written. The information may be read at arbitrary times. Preferably, the information is read at a wake-up phase of the mobile station. Of course, the information transmitted by the base station needs to be stored before the wake-up phase, for example during a previous operating phase of the mobile station. Note that the method 500 may comprise further acts executed between the acts S2 and S3. For example, the mobile station may meanwhile be switched off and on.

In a fourth method act S4, the mobile station searches for a dummy bearer. The mobile station thereby uses the information read in act S3. For example, the search may be initiated by a wake-up or switching on of the mobile station. The mobile station then starts the search in order to synchronize to a base station. The method act S4 may thus be regarded as an initiation of a synchronizing between the mobile station and a base station, wherein the initiation is performed by the mobile station. At the start of this initiation the base station is in an active mode. That is, the base station is not in a sleep mode and permanently sends out a dummy bearer to support mobile stations to synchronize to the base station.

The mobile station searches for a dummy bearer based on the information read in act S3. For example, the mobile station may have read an list including three frequency channels: F3, F6, F0. Note that the channels need not necessarily to be ordered. However, in the following it is assumed that the frequency channels are ordered according to an RSSI measurement, the frequency channel with the lowest signal strength being assigned to the highest priority followed by the channel with the next lowest signal strength and so on. Alternatively, the at least overcrowded frequency channel may be assigned to the highest priority.

The mobile station first searches for a dummy bearer on the frequency channel F3 starting with an arbitrary channel of the downlink. If no dummy bearer is found, the mobile station searches on another channel of the same frequency channel F3. This way, all channels of the frequency channel F3 are searched until a dummy bearer is identified or not. The channels of the frequency channel F3 may be searched in an arbitrary order or by an arbitrary algorithm. For example, the channels may simply be searched in an ascending order of their numbers, that is from time slot 0 to time slot 23.

If no dummy bearer is found in the frequency channel F3, the mobile station continues its search on the next frequency channel on the list, i.e. channel F6. Now all possible channels of channel F6 are scanned to identify a dummy bearer. If no dummy bearer is found on channel F6, the mobile station searches on frequency channel F0. If still no dummy bearer is found on the frequency channel F0, the mobile station may return to start its search on the frequency channel F3. Alternatively, the mobile station may start another search procedure, for example based on a search algorithm already known from the prior art.

The invention claimed is:

1. A method for synchronizing a mobile station to a base station,
wherein the base station is a fixed part of a Digital Enhanced Cordless Telecommunications (DECT) system and the mobile station is a portable part of a DECT system, comprising, in the base station:
generating an information indicating a frequency of a channel which is used to transmit data about an identity of the base station, the generating of the information depending on a Received Signal Strength Indication (RSSI) measurement; and transmitting the information indicating the frequency from the base station to the mobile station in a B field of a DECT dummy bearer.

2. The method according to claim 1, wherein the information is transmitted using the channel which is used to transmit data about the identity of the base station.

3. The method according to claim 1, wherein generating the information depends on determining a channel having a lowest signal strength.

4. The method according to claim 1, further comprising:
ordering information about frequencies according to increasing signal strengths of corresponding frequency channels.

5. A method for synchronizing a mobile station to a base station,
wherein the base station is a fixed part of a Digital Enhanced Cordless Telecommunications (DECT) system and the mobile station is a portable part of a DECT system, comprising, in the mobile station:
reading an information indicating frequencies of a channel received in a B field of a DECT dummy bearer, wherein the information has been transmitted from the base station to the mobile station, and the information depends on a Received Signal Strength Indication (RSSI) measurement; and
searching for a frequency channel with a dummy bearer that has an identity of a base station using the read information indicating the frequencies, thereby initiating the synchronizing.

6. The method according to claim 5, wherein the information is read during a wake-up phase of the mobile station.

7. The method according to claim 5, further comprising:
storing the information in the base station and/or the mobile station.

8. The method according to claim 7, further comprising:
updating the stored information in the mobile station during a wake-up phase of the mobile station.

9. The method according to claim 5, wherein the synchronizing is initiated by the mobile station upon searching for the dummy bearer; and the base station is in an active mode at a start of the initiation.

10. A base station comprising:
a first unit to generate an information indicating a frequency of a channel which is used to transmit data about an identity of the base station, the information depending on a Received Signal Strength Indication (RSSI) measurement; and
a second unit to transmit the information indicating the frequency from the base station to a mobile station in a B field of a DECT dummy bearer, wherein the base station is a fixed part of a Digital Enhanced Cordless Telecommunications (DECT) system and the mobile station is a portable part of the DECT system.

11. A mobile station,
wherein the mobile station is a portable part of a Digital Enhanced Cordless Telecommunications (DECT) system,
the mobile station comprising:
a first unit to read an information indicating frequencies of a channel received in a B field of a DECT dummy bearer, wherein the information indicating the frequencies has been transmitted from a base station of the DECT system to the mobile station, and the information depends on a Received Signal Strength Indication (RSSI) measurement; and
a second unit to search for a frequency channel with a dummy bearer that has an identity of a base station using the read information indicating the frequencies to thereby initiate a synchronizing of the mobile station to the base station.

12. The method according to claim 1, further comprising synchronizing between the base station and the mobile station after a loss of synchronization upon the second unit searching for the dummy bearer using the read information.

13. The method according to claim 5, further comprising synchronizing between the base station and the mobile station after a loss of synchronization using the information.

14. The method according to claim 1, further comprising transmitting information about a prospective change of the frequency to the mobile station.

15. The method according to claim 5, further comprising receiving information about a prospective change of the frequency to the mobile station.

16. The method according to claim 1, further comprising then generating and transmitting a further information indicating a further frequency of a channel usable for transmitting data about the identity of the base station.

17. The method according to claim 5, further comprising then receiving a further information indicating a further frequency of a channel usable for transmitting data about the identity of the base station.

18. The method according to claim 1, further comprising repeating the generating of information indicating a channel frequency based on the RSSI measurement and the transmitting in time intervals.

19. The base station according to claim 10,
wherein the first unit is to repeat the generating of information indicating a channel frequency based on the RSSI measurement in time intervals, and
wherein the second unit is to repeat the transmitting in time intervals.

* * * * *